United States Patent
McCrady

(10) Patent No.: US 9,219,402 B2
(45) Date of Patent: Dec. 22, 2015

(54) ECOCHARGE POWER PLANT

(71) Applicant: Dennis D McCrady, Albuquerque, NM (US)

(72) Inventor: Dennis D McCrady, Albuquerque, NM (US)

( * ) Notice: Subject to any disclaimer, the term of this patent is extended or adjusted under 35 U.S.C. 154(b) by 0 days.

(21) Appl. No.: 14/737,106

(22) Filed: Jun. 11, 2015

(65) Prior Publication Data

US 2015/0280540 A1    Oct. 1, 2015

(51) Int. Cl.
*H02K 47/00*    (2006.01)
*H02K 3/04*    (2006.01)
*H02K 53/00*    (2006.01)

(52) U.S. Cl.
CPC ............... *H02K 47/00* (2013.01); *H02K 53/00* (2013.01); *Y10S 74/09* (2013.01)

(58) Field of Classification Search
CPC .......... Y10S 74/09; H02K 47/00; H02K 3/04; H02K 23/26; H02K 53/00; H02K 7/1815; H02K 7/1846; H02K 7/006; B60L 8/00; B60L 11/002; Y02T 10/7083; Y02T 10/641
USPC ................................. 310/113, 103
See application file for complete search history.

(56) References Cited

U.S. PATENT DOCUMENTS

| | | | | |
|---|---|---|---|---|
| 4,153,757 A * | 5/1979 | Clark, III | ......................... | 429/47 |
| 5,046,056 A * | 9/1991 | Sallas | ..................... | G01V 1/181 |
| | | | | 310/329 |
| 5,906,236 A * | 5/1999 | Adams | ....................... | F28F 3/12 |
| | | | | 165/147 |
| 5,907,521 A * | 5/1999 | Matsui | .................. | G01K 11/004 |
| | | | | 310/327 |
| 6,465,915 B1 * | 10/2002 | Kerdjoudj | .............. | F16H 37/041 |
| | | | | 31/40 MM |
| 9,130,414 B2 * | 9/2015 | McCrady | ................... | H02K 3/04 |
| | | | | 1/1 |
| 2002/0096953 A1 * | 7/2002 | Shingai | .................... | B29C 45/26 |
| | | | | 310/90 |
| 2006/0197404 A1 * | 9/2006 | Creviston | .................. | H02K 9/06 |
| | | | | 310/263 |
| 2014/0285047 A1 * | 9/2014 | McCrady | .................. | 310/154.01 |

* cited by examiner

*Primary Examiner* — Alex W Mok

(57) ABSTRACT

The earth's magnetic field has not been mined as a source of energy. With average field strength of $0.5 \times 10^{-4}$ Tesla around the world it is easy to understand why. A disruptive technology is needed to mine the earth's magnetic field. Such a technology, graphene, is now at an early stage of development with excellent properties in the form of high conductivity, low resistivity sheets that are durable, light weight, and low cost. Multiple sheets of graphene provide a significant multiplier to earth's magnetic field yielding a feasible source of ecologically clean power. Graphene based EcoCharge units can be driven by electric motors putting graphene in motion to mine the earth's magnetic field. Estimates show that 150 Eco-Charge units driven by 15 electric motors using 905 kW of input electrical power will generate 504 MW, the output power of a standard coal fired power plant.

2 Claims, 9 Drawing Sheets

21 Rg = resistance of graphene sheets
22 Rtbc = tab-brush-commutator resistance
23 emf = electromotive force
24 I = current (RMS)

ECOCHARGE POWER PLANT

CROSS REFERENCE TO RELATED APPLICATIONS (IF ANY)

None.

STATEMENT OF FEDERALLY SPONSORED RESEARCH/DEVELOPMENT (IF ANY)

None.

NAMES OF THE PARTIES TO A JOINT RESEARCH AGREEMENT IF THE CLAIMED INVENTION WAS MADE AS A RESULT OF ACTIVITIES WITHIN THE SCOPE OF A JOINT RESEARCH AGREEMENT

None.

REFERENCE TO A "SEQUENCE LISTING," A TABLE, OR A COMPUTER PROGRAM LISTING APPENDIX SUBMITTED ON A COMPACT DISC AND INCORPORATION BY REFERENCE OF THE MATERIAL ON THE COMPACT DISC. THE TOTAL NUMBER OF COMPACT DISCS INCLUDING DUPLICATES AND THE FILES ON EACH COMPACT DISC SHALL BE SPECIFIED

None.

BACKGROUND OF THE INVENTION

Nature provides many resources that can be used to reduce dependence on coal, oil, gas, and nuclear for powering our homes, offices, factories, and modes of transportation. Solar and wind power have been the most used natural resources to supplement coal, oil, gas, and nuclear for powering and heating homes, offices, and factories. Prototypes for gathering energy from waves and tides have also been constructed and are being evaluated as a supplement to coal, oil, gas and nuclear as well. Solar powered photovoltaic (PV) cells have shown the most promise when it comes to providing power for transportation and seemingly are a good fit with current electric car technology. In addition, much work has been done in the area of rooftop solar PV cells for supplementing the grid.[1]

[1] P. Fairley, "How Rooftop Solar Can Stabilize the Grid," IEEE Spectrum, February 2015, p 10.

There is another natural resource that has not been mined as an alternate source of energy: the earth's magnetic field. With average field strength approximately $0.5 \times 10^{-4}$ Tesla (T) around the world, it is easy to see why this resource has been overlooked. If a system to mine the earth's magnetic field is developed for a power plant using moving electrical wire after Faraday then Maxwell, even the most efficient aluminum wire requires an impractical length to generate a small amount of power at a usable voltage. As good as the electrical properties of aluminum wire are, they are not sufficient for this application. It is clear that a disruptive technology is needed to mine the earth's magnetic field for power plants in lieu of coal, nuclear, wind and solar resources.

Such a disruptive technology, graphene,[2] is now at an early stage of development. Graphene has excellent electrical properties in the form of high conductivity and low resistivity, is extremely strong and durable, and is relatively inexpensive. It is now being produced in sheets[3] large enough to be used for EcoCharge. In addition, MIT is setting up an industrial scale graphene printing press in its graphene lab[4] and Purdue University spin-off BlueVine Graphene Industries, Inc.[5] now produces roll-to-roll graphene. The unique feature of graphene for mining the earth's magnetic field is its ability to conduct electricity in low resistivity, two-dimensional sheets. In effect, graphene is a two-dimensional "wire" that will generate current proportional to its resistivity, area, and orientation and motion with respect to the earth's magnetic field. As will be shown below, these properties provide a significant multiplier to earth's weak magnetic field yielding a feasible source of ecologically clean electric power for power plants. Not only is it ecologically clean but it is constant, day and night, solving the rooftop solar regulation problem detailed in Fairley (1) resulting from night time loss of sunlight.

[2] The Royal Swedish Academy of Sciences, "Scientific Background on the Nobel Prize in Physics 2010," Kungl. Vetenskaps-Akademien, 5 Oct. 2010.
[3] http://www.graphene-info.com/sony-developed-new-r2r-method-make-graphene-produced-100-meter-long-sheet
[4] http://idealab.talkingpointsmemo.com/2011/09/mit-setting-up-industrial-scale-graphene-printing-press.php
[5] http://www.purdue.edu/newsroom/releases/2014/Q3/purdue-based-startup-scales-up-graphene-production,-develops-biosensors-and-supercapacitors.html EcoCharge units convert earth's magnetic field to electrical current continuously powering a power plant[6]. The basic EcoCharge concept of using graphene for the conversion medium was taught by U.S. patent application Ser. No. 13/847,445 (EcoCharge). Many of the present EcoCharge Power Plant implementation techniques are also taught by U.S. patent application Ser. No. 13/847,445 and will be noted herein. As will be shown below, the EcoCharge Power Plant implementation is enough different from U.S. patent application Ser. No. 13/847,445 to warrant a separate patent application. For the vehicle mounted application, Ser. No. 13/847,445, EcoCharge units are mounted on the axles and driveshaft of the vehicle, orthogonal to one another and with obvious size and weight restrictions, in order to generate electrical power when the vehicle is moving at any orientation to the earth's magnetic field. For the present power plant application, EcoCharge units will be "stationary" and mounted at 0° to the earth's magnetic field to maximize the conversion process. Note that EcoCharge units in the power plant can be mounted on moveable bases to allow for moving the units to maintain the desired 0° orientation with the earth's magnetic field as it changes in the future.

[6] Power plant is a general category including plants supplying power to the grid or to various sized users or groups of users.

BRIEF SUMMARY OF THE INVENTION

In general, EcoCharge units comprising the stationary power plant will be mounted at 0° to the earth's magnetic field to maximize the conversion process. Conversion of magnetic to electrical energy is a maximum when the graphene sheets and the earth's magnetic field are oriented at 0° with respect to one another as shown in the Performance section below. There is nothing that blocks or shields magnetic fields[7] so EcoCharge systems will be deployed indoors for protection from the environment.

[7] A. Green, "Shielding Magnetic Fields," The Industrial Physicist, American Institute of Physics, October/November 2001.

As shown in FIG. 1, the basic EcoCharge unit contains graphene sheets 1 wrapped around and attached to the mounting drum 2 with insulator 3, insulating the graphene sheets from the drum, and using an insulator ridge 4 to separate ends of the graphene sheets. Two end wheel mounting hubs 5 are used to mount the drum to the driveshaft 6. The graphene sheets are connected to the commutator 7 input at one end of the system through interface tabs 8 and tab connectors 9. The commutator mount is attached to the mounting drum allowing the commutator to rotate with the driveshaft. A bearing 10 is mounted on the drive shaft at the other end of the unit and used to establish the driveshaft height and provide rotation within the mounting cover 11. The commutator brush 12 and brush mount 13 anchor to the mounting cover along with the base of the bearing. The mounting cover is sealed protecting components mounted to the drive shaft from dirt, moisture or other contaminants present in the power plant.

When the drive shaft rotates, the drum mounted graphene sheets and commutator rotates and converts the earth's magnetic field into electromotive force (emf) causing electric current to flow as a function of driveshaft angular velocity and orientation to the earth's magnetic field. Electric current from the graphene sheets is routed to the commutator through the interface tabs 8 and tab connectors 9. The commutator transfers current from the graphene sheets using its brushes 12 (with brush mounts 13) then electrical power is supplied through the mounting cover to the inverters 14 and power combiner 15 shown in FIG. 2. It will be shown below in the Performance section using a specific example assumed for feasibility analysis that a typical EcoCharge unit can generate 4.15 Mega Watts Root-Mean-Square (MW RMS) at a driveshaft angular velocity of 12,000 revolutions per minute (rpm).

Multiple EcoCharge units are needed to populate an EcoCharge power plant and could conceivably generate all of the power required to replace an existing coal fired, nuclear, or solar power plant. In addition, an EcoCharge power plant could be tailored for individual residences or businesses or a desired number of each as the need arises. A conceptual block diagram of an EcoCharge power plant is shown in FIG. 2. As shown, a row of N EcoCharge units are driven by a single electric motor 16. There are M electric motors yielding a total of M×N EcoCharge units. The output from each EcoCharge unit drives an inverter to convert the frequency of the generated power to 60 Hz to match the grid. The inverted, 60 Hz power generated by the M×N array of EcoCharge units is then combined in the Power Combiner 15 providing the total EcoCharge power plant output power. It will be shown in the Performance section below for the example M=10, N=15 (150 EcoCharge units) and driveshaft angular velocity of 12,000 rpm, the hypothetical power plant will generate an output power of 504 MW RMS assuming a conservative inverter efficiency of 90%[8] along with a power combiner efficiency of 90%.

[8]J. W. Kolar, T. Friendli, F. Krismer, and S. D. Round, "The Essence of Three-Phase AC/AC Converter Systems," Power Electronics and Motion Control Conference, EPE-PEMC 2008, September 2008, pp 27-42.

BRIEF DESCRIPTION OF THE SEVERAL VIEWS OF THE DRAWING (IF ANY)

DETAILED DESCRIPTION OF THE INVENTION

Introduction

EcoCharge units utilize a technology breakthrough in materials, graphene, to mine the earth's magnetic field for an ecologically clean source of electrical energy to continuously power a power plant. Magnetic fields are not shielded by structures allowing EcoCharge units to be mounted inside a building for protection from the environment. In an example in the Performance section below, it is estimated that a single EcoCharge unit can generate 4.15 MW RMS of electrical power using a drive shaft rotating at 12,000 rpm when the graphene sheets are at 0° to the earth's magnetic field. Further, the example below with 150 EcoCharge units produces 504 MW RMS, enough power to replace a typical coal fired power plant.

System Description

To enable a more detailed description of the proposed invention an example system is used. The purpose here is to show that EcoCharge is feasible while not limiting current and future implementation possibilities. There will be additional architecture choices as EcoCharge is applied to different circumstances and as technology advances in the future.

Figure 1:
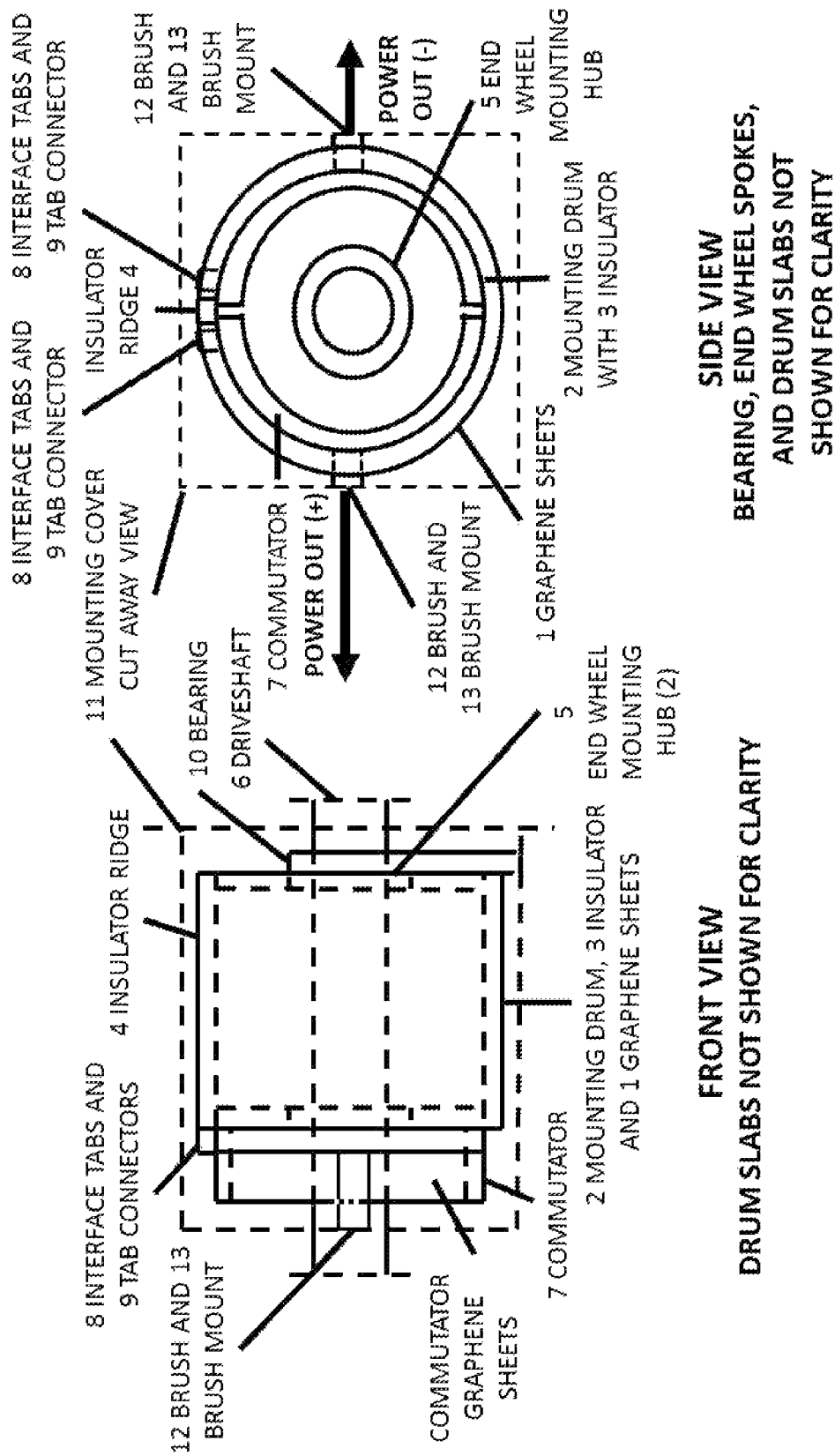
FIG. 1 is a sketch (not to scale) of the EcoCharge Unit using a cut away view of the mounting cover to show the components of the system, how the components are contained within a sealed mounting cover, and how the system mounts to the drive shaft.
Figure 9:
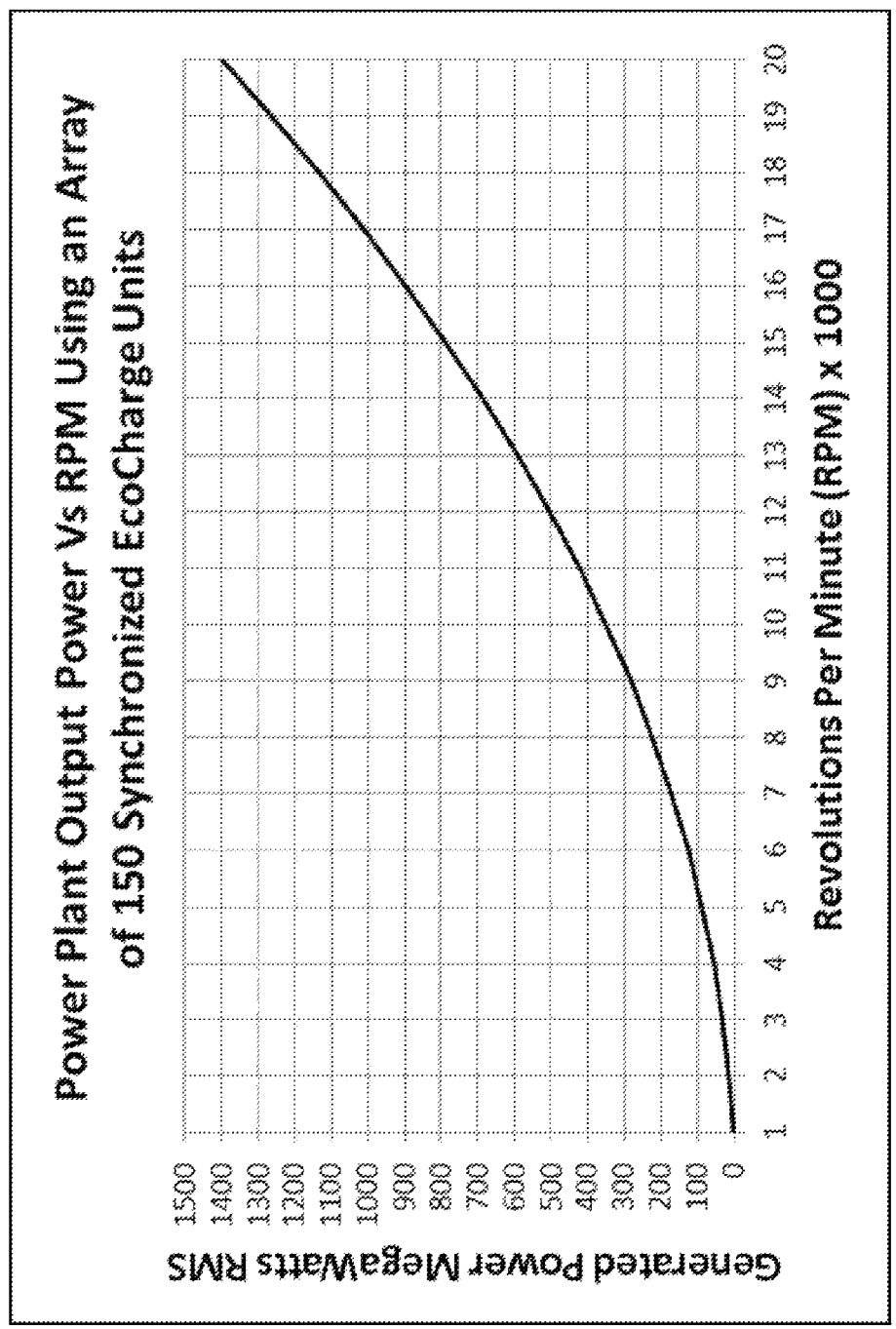
FIG. 9 is a plot of EcoCharge Power Plant output power versus rpm using an array of 150 synchronized EcoCharge Units like the example in the Performance section below.

The example used in this patent application is based on the sketch (not to scale) of the EcoCharge unit shown in FIG. 1. The electric motor powering the EcoCharge unit is not shown in FIG. 1 for simplicity. This EcoCharge unit assumes graphene sheets of width 1.5 meters (m), approximately 5 feet ('), with a 1 m diameter, approximately 3.3', feasible dimensions with the present state of the art. For this example, it is assumed that the drive shaft is rotating at 12,000 rpm. A more complete analysis will be shown later in the Performance section where a parametric curve is plotted for drive shaft rotation between 1,000-20,000 rpm (FIG. 9).

EcoCharge converts earth's magnetic field to electrical current continuously powering the power plant. As shown in FIG. 1, the example EcoCharge unit contains graphene sheets 1 wrapped around and attached to the mounting drum 2 with insulator 3 assumed here to be carbon fiber, insulating the graphene sheets from the drum and contributing to the sturdiness of the drum. An insulator ridge 4 is used to separate ends of the graphene sheets. Two end wheel mounting hubs 5 are used to mount the drum to the driveshaft 6. The graphene sheets are connected to the commutator 7 input at one end of the unit through interface tabs 8 and tab connectors 9. The commutator mount is attached to the mounting drum allowing the commutator to rotate with the driveshaft. The commutator has two sections where each section is implemented with 6,755 graphene sheets attached to the commutator mount leaving a small gap between the sections at each end. A bearing 10 is mounted on the drive shaft at the other end of the unit and used to establish the driveshaft height and provide rotation within the mounting cover 11. The commutator brush 12 and brush mount 13 anchor to the mounting cover along with the base of the bearing. The mounting cover is sealed protecting components mounted to the drive shaft from dirt, moisture or other contaminants present in the power plant. When the drive shaft is rotated by the electric motor 16 shown in FIG. 2, the drum mounted graphene sheets rotate and convert the earth's magnetic field into emf causing electric current to flow as a function of driveshaft angular velocity and orientation to the earth's magnetic field. Electric current from the graphene sheets is routed to the commutator graphene sheets through the interface tabs 8 and tab connectors 9. The commutator transfers current from the graphene sheets using its brushes 12 (with brush mounts 13) then electrical power is supplied through the mounting cover to the inverters 14 and power combiner 15 of the electrical system shown in FIG. 2. It will be shown below in the Performance section using this example that a typical EcoCharge unit can generate 4.15 MW RMS at a driveshaft angular velocity of 12,000 rpm.

Multiple EcoCharge units are needed to populate an EcoCharge power plant and could conceivably generate all of the power required to replace an existing coal fired, nuclear, or solar power plant. In addition, an EcoCharge power plant could be tailored for individual residences or businesses or a desired number of each as the need arises.

Figure 2:
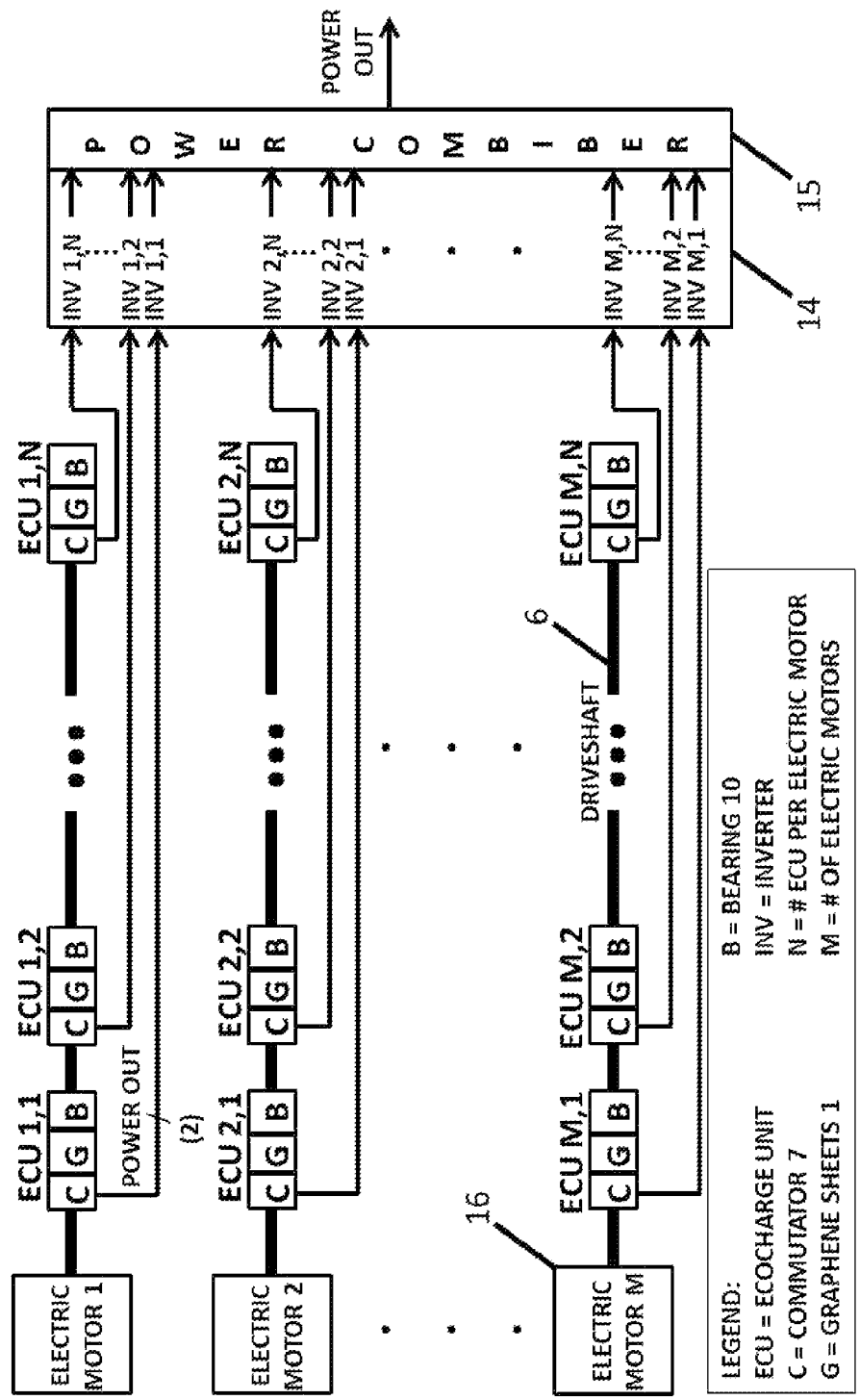
FIG. 2 is a sketch (not to scale) of the conceptual block diagram of the general EcoCharge Power Plant showing N EcoCharge Units per electric motor, M electric motors, M×N inverters, with the total output power generated in the power combiner.

A conceptual block diagram of an EcoCharge power plant is shown in FIG. 2. As shown, a row of N EcoCharge units are driven by a single electric motor 16. There are M electric motors yielding a total of M×N EcoCharge units. The power generated by the M×N array of EcoCharge units is inverted 14 then combined in the Power Combiner 15 providing the total EcoCharge power plant output power. It will be shown in the Performance section below for the example M=10, N=15 (150 EcoCharge units) with driveshaft angular velocity of 12,000 rpm, the hypothetical power plant will generate an output power of 504 MW RMS assuming the inverters and power combiner are 90% efficient.

Figure 3:
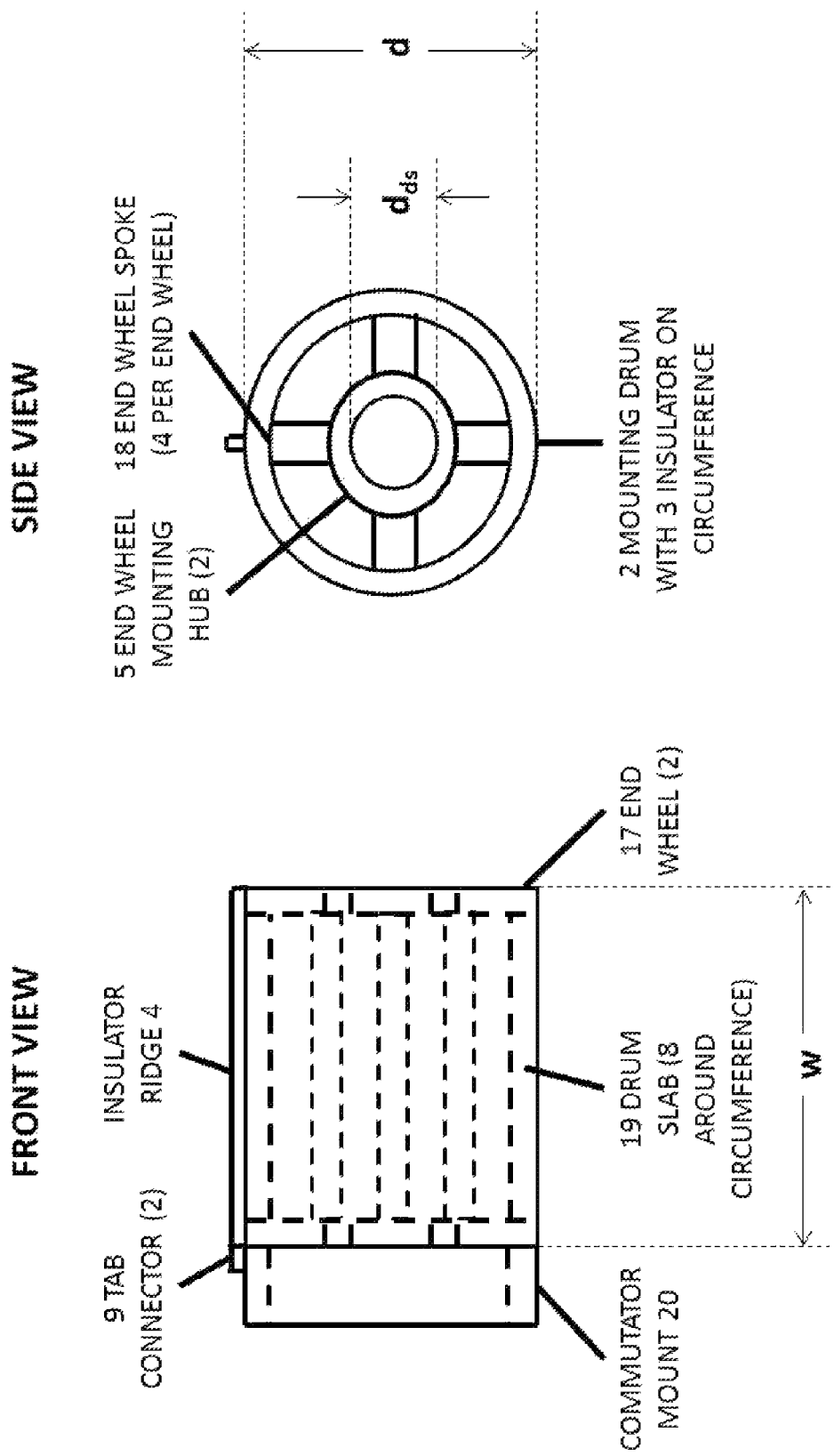
FIG. 3 is a sketch (not to scale) of the mounting drum used to mount the graphene sheets and commutator, tying them to the rotation of the drive shaft.

FIG. 3 is a more detailed sketch (not to scale) of the mounting drum 2, where all parts are fabricated from ABS except the carbon fiber insulator. All drum part dimensions and weights are shown below in Table 1 of the Performance section. As shown, the two end wheels 17 with end wheel mounting hubs 5 are used to mount the drum to the drive shaft. The end wheel spokes 18, four per end wheel, provide sturdiness to the ends of the drum. The drum also includes eight drum slabs 19 positioned around its circumference and the drum circumference is covered with carbon fiber for light weight structural integrity. Note that the commutator mount 20 is 6" wide to support the two section, 1.5" wide, 6,755 sheet graphene commutator along with the 4.5" tabs 8 and tab connectors 9. The drum is insulated from the graphene sheets by the carbon fiber insulator 3 so the electric current generated by EcoCharge is transferred through the system and not drained through the drive shaft. The carbon fiber insulator also provides sturdiness as mentioned above. The layered graphene sheets abut each side of the insulator ridge 4. This is a convenient breakpoint for defining the (+) and (−) interface tabs used for capturing the EcoCharge electrical current generated by emf. For the example used here and in the performance section below, the drum diameter (d) is 1 m (3.3'), the drive shaft diameter ($d_{ds}$) is 0.063 m (2.5"), and the drum width (w) is 1.5 m (5').

Figure 4:
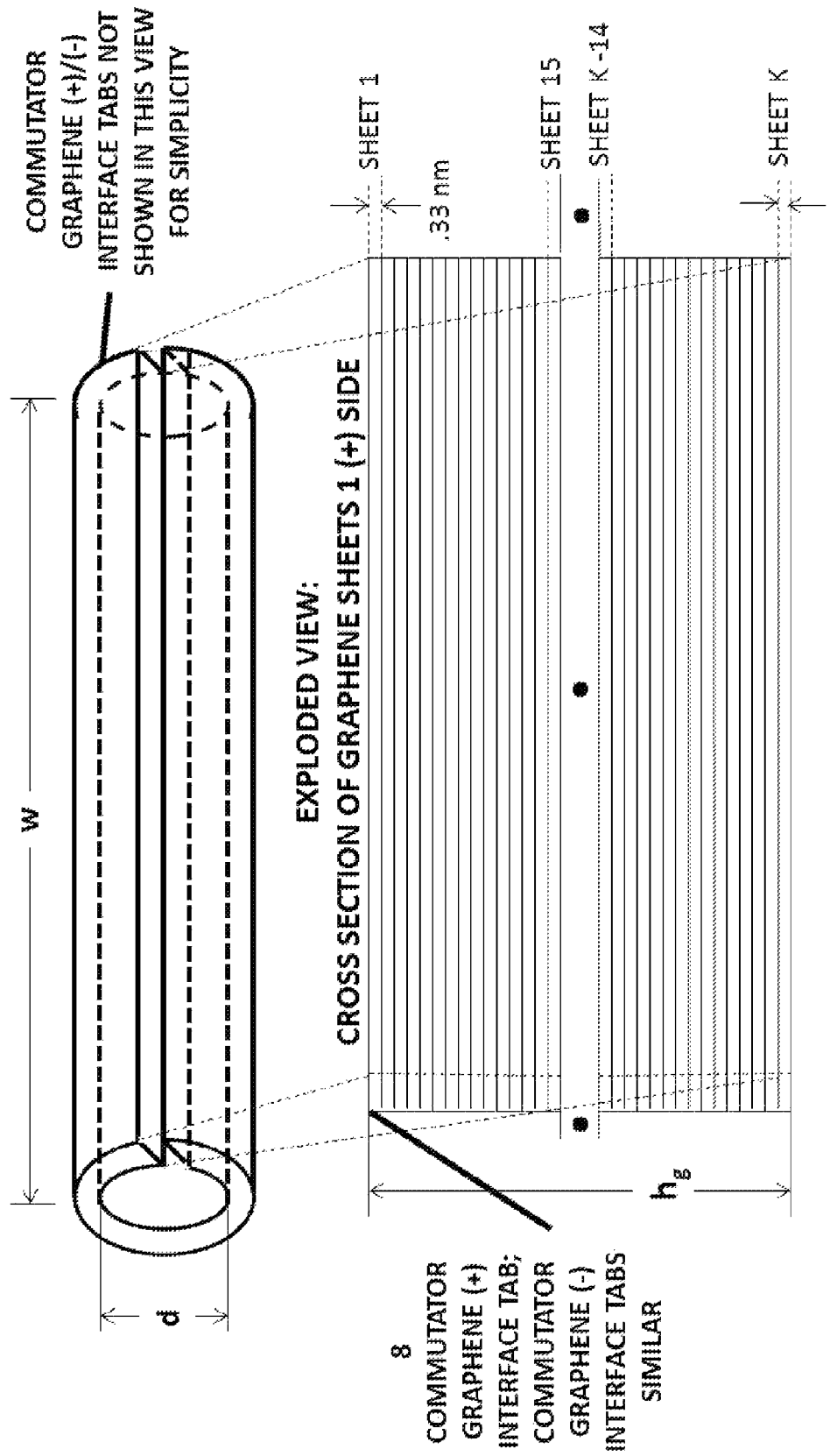
FIG. 4 is a sketch (not to scale) of the layered graphene sheets which mount directly to the insulator on the mounting drum including the commutator to graphene (+) interface tabs.
Figure 5:
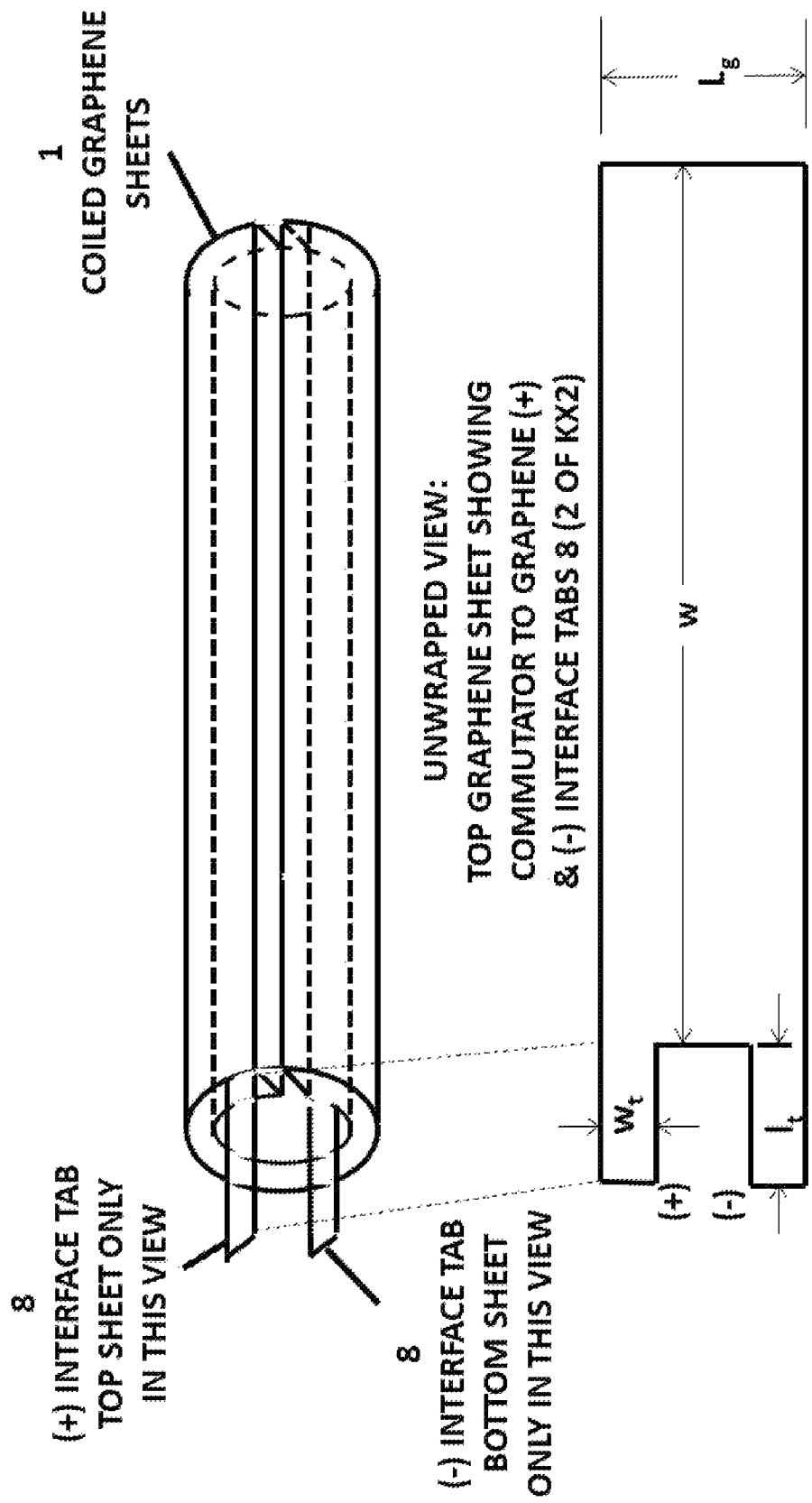
FIG. 5 is a sketch (not to scale) showing more detail of the commutator to graphene (+) and (−) interface tabs that protrude from all graphene sheets.

There are 6,755 graphene sheets required for the illustrative example being used. Calculations to determine the number of required sheets, 6,755, are included in the Performance section below. These graphene sheets 1, shown in the sketch in FIG. 4 (not to scale), are mounted directly on and connected to the mounting drum insulator described above. Each sheet has the thickness of a single atom of carbon, equal to 0.33 nanometer (nm) while the depth of 6,755 sheets of graphene is 2.23 micrometers (μm). Commutator graphene (+) interface tabs 8 are shown in the exploded view at the bottom of FIG. 4 but they were excluded from the top 3-dimensional sketch for simplicity. A more detailed sketch of both (+) and (−) interface tabs 8 is shown in FIG. 5. This sketch (not to scale) shows how the interface tabs protrude $I_t$=0.114 m (4.5") beyond the top and bottom ends of the same side of the typical graphene sheet that is $I_g$=3.14 m high by 1.5 m wide in order to interface with the commutator for the assumed example. The interface tabs are $w_t$=0.019 m (0.75") wide. There are 6,755 (+) and 6,755 (−) or a total of 13,510 interface tabs for this example.

Figure 6:
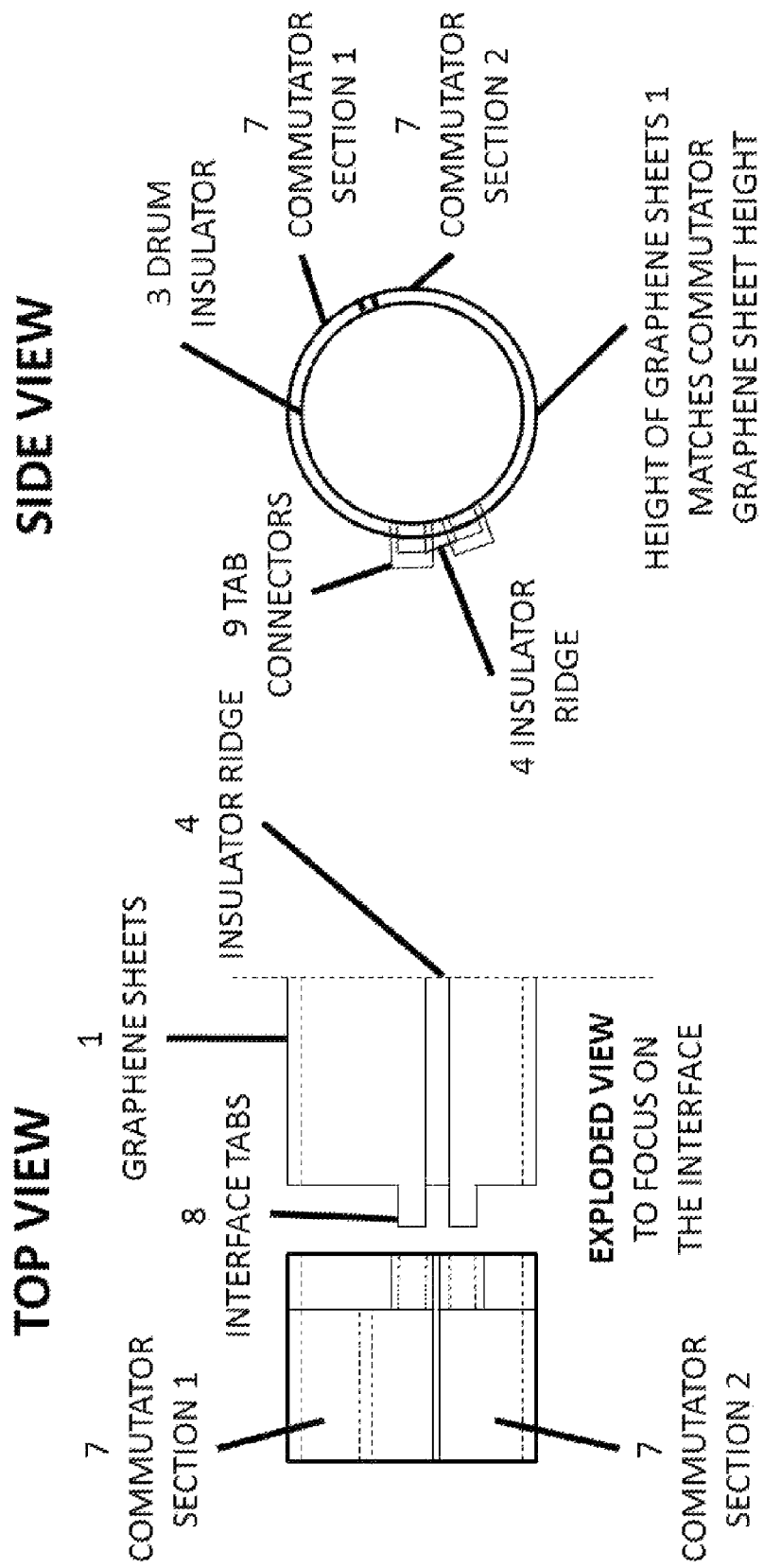
FIG. 6 is a sketch (not to scale) showing an exploded view of the graphene tab to commutator interface highlighting the two section commutator and the tab connectors.

As their name implies, the interface tabs interface the graphene sheets, where the emf is generated, to the commutator where emf is converted to useful electrical power. As shown in the sketch in FIG. 6 (not to scale), the graphene commutator interface consists of securing the graphene tabs 8 into the tab connectors 9. Note that a two section, 6,755 sheet graphene commutator is assumed in the illustrative example for simplicity. The commutator is assumed to be fabricated from graphene because presently there are no off the shelf commutators in the size needed for the EcoCharge unit with high enough current handling capability and low enough resistance and weight. In addition, the tab connectors 9 shown in FIG. 6 are illustrative of one simple technique. Again, the intent in this patent application is to describe a feasible connection scheme but not limit future implementations. Also, commutators with more than two sections can be used to improve the system emf to electrical load current conversion efficiency by adding more insulator ridges, interface tabs, and tab connectors to line up with multiple sections of the commutator as done in many standard DC motors. The intent of this patent application is to describe the simplest two section commutator implementation but not rule out multiple section commutators in the future.

Figure 7:
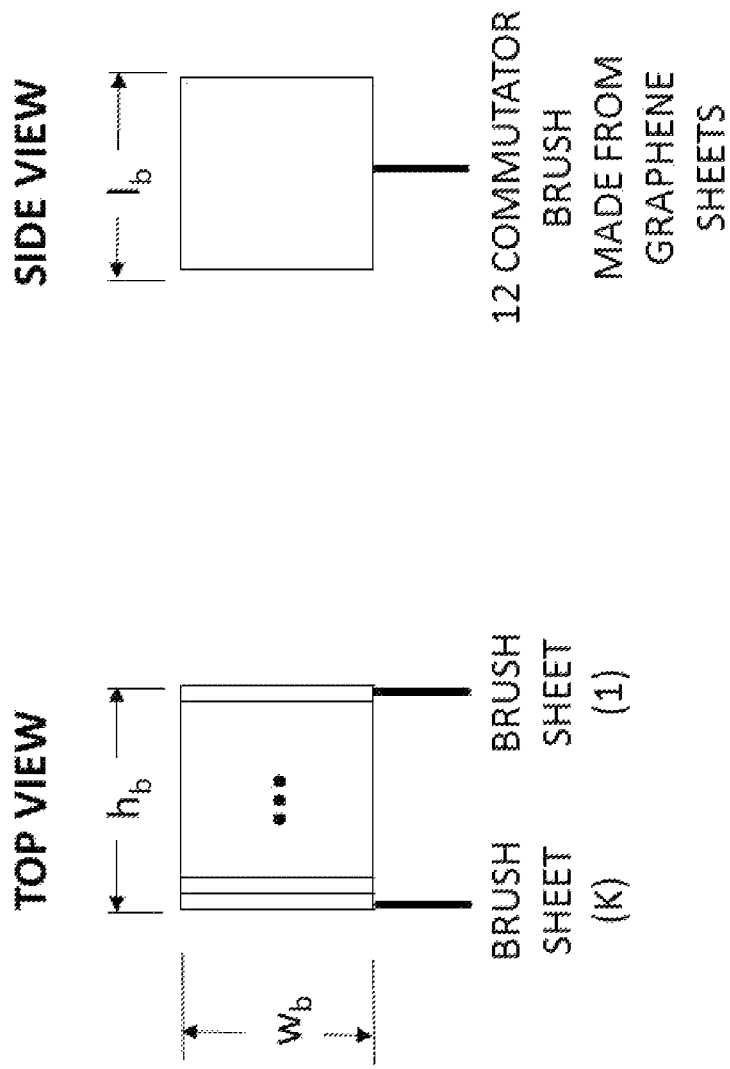
FIG. 7 is a sketch (not to scale) illustrating how the commutator brush is constructed from sheets of graphene.

A commutator brush 12 for this illustrative example is shown in FIG. 7 (not to scale). The brush (one of two needed for this example) is implemented using 6,755 layered graphene sheets. As will be shown in the Performance section below, graphene brushes are required because of graphenes' current handling capability and the amount of current delivered through the brushes for this application. Presently there are no off the shelf commutator brushes available in the size needed for EcoCharge with a high enough current handling capability, graphene is the only choice. If necessary, future applications that require higher current flow through the brushes can increase the size of the brushes to improve current handling capability. Current handling capability for the illustrative example is detailed in the Performance section below.

To complete the commutator design, brush mounts, brush arms, and brush arm mounts are needed. These are all assumed implemented with high quality copper to ensure negligible resistance and the proper current handling capacity. Brush arms are needed to apply tension to the brush on the commutator for good electrical conduction. As shown in FIG. 1, the brush mount 13 is mounted to the mounting cover 11 keeping the tensioned brush stationary while the commutator rotates beneath it. Not shown for simplicity in FIG. 1 but implied are the short lengths of heavy gauge copper wire (negligible resistance with high current handling capacity) running from the commutator brush arm mounts through a via in the mounting cover supplying the EcoCharge generated power to the inverters and power combiner. The brush mounts, brush arms and brush arm mounts are within present manufacturing capability. If current handling capacity becomes a problem in the future, graphene based devices can be developed. Note that the mounting cover 11 shown in FIG. 1 is environmentally sealed to keep moisture and dirt (that would interfere with EcoCharge operation) away from the graphene. Also in FIG. 1, both ends of the mounting cover 11 require sealed openings for the driveshaft 6 for the same purpose.

Performance

The purpose of the Performance Section is to show feasibility of the EcoCharge power plant concept by determining pertinent performance parameters using well known methods and equations. In order to provide realistic results, a specific example has been defined for analysis using values of parameters that are available in the open literature and making realistic assumptions when necessary to proceed. The specific example used was described earlier in the System Description Section. Analyzing a specific example is not intended to limit the scope of this patent application but to serve as a realistic test case to verify EcoCharge power plant feasibility. The claims below will be used to define the breadth of this EcoCharge power plant patent application.

As a realistic and illustrative example for analysis assume:
1. The drive shaft rotates at 12,000 rpm.
2. The drive shaft frequency f=12,000 rpm/60 seconds/minute=200 rps.
3. The angular velocity of the drive shaft $\omega$=27200 rps.
4. The diameter of the drive shaft is $d_{ds}$=0.06352 m (2.5").
5. The diameter of the mounting drum=d=1 m (3.3').
6. The width of the graphene sheets on the mounting drum w=1.5 m (5').
7. The area of the graphene sheets exposed to the earth's magnetic field A=$\pi \cdot d \cdot w$=4.7 $m^2$.
8. The assumption is that graphene sheets can be layered to support the EcoCharge power plant application given the current state of graphene production technology. While there has not been much work to date on stacking or layering graphene sheets,[9,10,11] applications such as EcoCharge (U.S. application Ser. No. 13/847,445) and the EcoCharge power plant will hopefully stimulate interest and advancements in the many graphene centers that have been established at prestigious universities such as MIT mentioned earlier.

[9] L. Zhang, et al, "The Experimental Observation of Quantum Hall Effect of I=3 Chiral Quasiparticles in Trilayer Graphene," Nature Physics 7, 953-957 (2011).
[10] X. Li, et al, "Transfer of Large-Area Graphene Films for High-Performance Transparent Conductive Electrodes," Nano Letters, Vol. 9, No. 12, 4359-4363, 2009.
[11] Graphene Technologies, http://www.graphenetechnologies.com/index.htm 9. The earth's magnetic field strength, B, is estimated at B=$0.5 \times 10^{-4}$ T.
10. The angle between the graphene sheets and the earth's magnetic field $\theta$=0° (cos 0°=1).
11. Assume sufficient layers of graphene to yield a total graphene resistance Rg=9.39 m$\Omega$ for good power transfer through the tabs, commutator brushes, and commutator sections defined above.
12. Assume acceptable power transfer through the series combination of two tab, two commutator brush, and two commutator section resistances is provided when the tab resistance is $R_t$=0.027 0, the brush resistance is $R_b$=0.012$\Omega$, and the commutator section resistance is $R_c$=0.19$\Omega$.
13. Assume a reasonable tab length is 0.114 m (4.5"), a reasonable brush length is 0.1 m (4"), a reasonable brush width is 0.038 m (1.5"), and tabs, brushes, and commutator sections are composed of 6,755 sheets of graphene for simplicity.
14. For purposes of this patent application, EcoCharge power plant total output power will be calculated at the power combiner 15 output assuming the inverters 14 and power combiner are 90% efficient. It is noted that the voltage could be stepped up at that point for more efficient power transmission to the grid.

Performance—EcoCharge Unit EMF Generated from the Earth's Magnetic Field

The emf, V, generated from the earth's magnetic field is derived from the following equation[12]:

[12] J. D. Kraus and K. R. Carver, Electromagnetics, second edition, McGraw-Hill Book Company, New York, N.Y., 1973, p 312, equation (II).

$$V = \oint (v \times B) \cdot dl, \quad (1)$$

where:
v=velocity,
B=earth's magnetic field, and
l=length.

For the EcoCharge unit, equation (1) expands to:

$$V = \omega B A \sin(\omega t) \cos \theta, \quad (2)$$

where:
$\omega = 2\pi f$=angular velocity of driveshaft,
f=frequency in revolutions per second (rps),
A=area of graphene sheets exposed to the earth's magnetic field=$\pi \times$the diameter of the mounting drum (d=1 m) times the width of the graphene sheets (w=1.5 m) on the mounting drum,
sin($\omega$t)=harmonic variation of the induced emf due to angular velocity of drive shaft, and
$\theta$=angle of the graphene sheets to the earth's magnetic field (from dot product).

Substituting the above assumed values for the illustrative example into equation (2) and realizing the commutator delivers the magnitude of the time varying emf:

$$V = |(2\pi 200)(0.5 \times 10^{-4})(4.7)\sin(\omega t)| \, V \, \text{Zero-to-Peak}(0\text{-}P) \quad (3)$$

$$|V| = 0.296 \, V \, 0\text{-}P \text{ of } emf \text{ per graphene sheet.} \quad (3a)$$

Performance—Resistance of Graphene Sheets, Number of Sheets, and Total EMF for the EcoCharge Unit Use assumption 11 and determine the number of graphene sheets, K, required to result in the resistance of the graphene sheets, $R_g$=9.39 m$\Omega$. The resistance of the graphene sheets, $R_g$, is defined as:

$$R_g = \rho L_g / A_g, \quad (4)$$

where:
$R_g$=9.39 m$\Omega$=per assumption 11 above,
$\rho$=graphene resistivity=$1 \times 10^{-8}$,
$L_g$=length of graphene sheets which is the circumference, $C_g$, of the mounting drum,
$L_g = C_g = \pi d = \pi(1) = 3.14$ m, $A_g$=cross sectional area of graphene sheets supporting emf generated current flow, $A_g$=height ($h_g$) of K graphene sheets×width (w)=$h_g$w=K$(0.33×10^{-9})(1.5)$ m².

Substituting into equation 4 and solving for K:

$$R_g=9.39×10^{-3}=1×10^{-8}(3.14)/[K(0.33×10^{-9})(1.5)],$$

$$K=1×10^{-8}(3.14)/[(9.39×10^{-3})(0.33×10^{-9})(1.5),\quad (5)$$

$$K=6,755\ \text{sheets}.\quad (5a)$$

To calculate the total emf generated by the EcoCharge unit with 6,755 graphene sheets in V 0-P, combine the results in equations 3a and 5a:

$$emf=(0.296V\ 0\text{-}P/\text{sheet})(6,755\ \text{sheets})=2,000V\ 0\text{-}P.\quad (6)$$

Converting to VRMS yields:

$$emf=0.707(2,000V\ 0\text{-}P)=1,414\ \text{VRMS}.\quad (6a)$$

Performance—Resistance and Width of Tabs, Brushes and Commutator

Width of the graphene tabs 8, $w_t$, detailed in FIG. 5 is computed with equation 4 above by substituting appropriate tab values and using assumptions 12 and 13 above.

$l_t$=assumed length of graphene tabs=0.114 m (4.5"), $A_t$=cross sectional area of graphene tabs assuming 6,755 sheets of graphene, $A_t$=height ($h_t$) of 6,755 tabs×width ($w_t$), $A_t$=6,755(0.33×10$^{-9}$)$w_t$, $R_t$=0.027=1×10$^{-8}$(0.114)/[6,755(0.33×10$^{-9}$)$w_t$].

Solving for $w_t$ yields:

$$w_t=0.019\ \text{m}(0.75").\quad (7)$$

Width of the graphene brushes 12, $w_b$, detailed in FIG. 7 is computed with equation 4 above by substituting appropriate brush values.

$l_b$=assumed length of graphene brushes=0.1 m (4"), $A_b$=cross sectional area of a brush assuming 6,755 sheets of graphene, $A_b$=height ($h_b$) of 6,755 graphene sheets×width ($w_b$), $A_b$=6,755(0.33×10$^{-9}$)($w_b$), $R_b$=0.012=1×10$^{-8}$(0.1)/[6,755(0.33×10$^9$)$w_b$].

Solving for $w_b$ yields:

$$w_b=0.038\ \text{m}(1.5").\quad (8)$$

The resistance of a commutator section, $R_c$, is determined assuming:

1. Each section of the two section commutator is constructed of 6,755 sheets of graphene;
2. Section length=C/2=(πd)/2=(3.14×1)/2=1.57 m;
3. Width=$w_c$=0.038 m (1.5");
4. Cross sectional area=$A_c$=6,755(0.33×10$^{-9}$) 0.038=8.47×10$^{-8}$ m²;

$$R_c=1×10^{-8}(1.57)/(8.47×10^{-8})=0.19\ \Omega.\quad (9)$$

Using assumption 12 above, the (+) tab, (+) brush, and (+) commutator section and (−) tab, (−) brush, and (−) commutator section resistances are in series yielding a total tab-brush-commutator resistance, $R_{tbc}$, of:

$$R_{tbc}=2(R_t+R_b+R_c)=2(0.027+0.012+0.19)\Omega,$$

$$R_{tbc}=0.46\ \Omega.\quad (10)$$

Performance—Power Generated from the Earth's Magnetic Field

Figure 8:
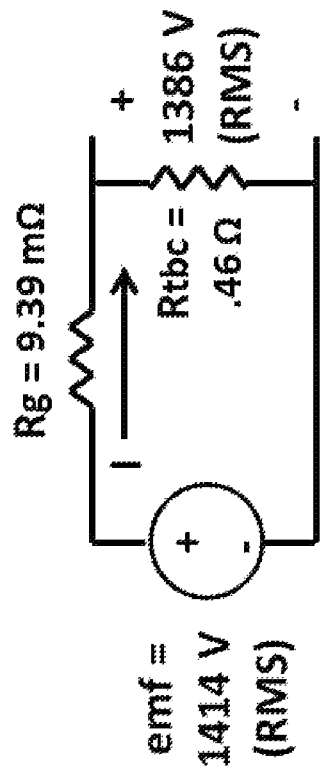
FIG. 8 is the electrical model used to calculate the EcoCharge Unit output power assuming an emf of 1414 Volts (V) RMS is generated by the graphene sheets for the example in the Performance section below, using the calculated resistance of the graphene sheets (Rg) and the series combination of the tab, commutator brush, and commutator section resistances (Rtbc).

Electrical power generated by the graphene sheets is computed using the electrical model of EcoCharge shown in FIG. 8 using assumption 14 above, i.e. at the power combiner output assuming the inverters and power combiner are 90% efficient. The resistance of the graphene sheets 21 is $R_g$=9.39 mΩ from assumption 11 above and is in series with the tab-brush-commutator resistance 22 $R_{tbc}$=0.46Ω from equation 10. This series combination of resistance is driven by the electromotive force 23 produced by the graphene sheets also calculated above, emf=1,414 VRMS. Current 24, I, generated by the emf flows through $R_g$ and $R_{tbc}$.

Output power, $P_o$, in WRMS is defined as the current in Amperes (A) RMS times the output voltage $V_o$ in VRMS:

$$P_o=I\times V_o.\quad (11)$$

Using the voltage division rule:

$$V_o=1414[R_{tbc}/(R_{tbc}+R_g)]=1414[0.46/(0.46+9.39\times 10^{-3})]=1,386\ \text{VRMS}.\quad (12)$$

Current is determined by:

$$I=emf/(R_g+R_{tbc})=1414/(0.46+9.39\times 10^{-3})=3,012\ \text{ARMS}.\quad (13)$$

Substituting the results of equations 13 and 12 into equation 11 yields the EcoCharge unit output power in WRMS given assumptions 1-14 above:

$$P_o=3,012\times 1,386=4.15\ \text{MWRMS}.\quad (14)$$

Performance—Current Handling of the Graphene Brushes

Current handling capability of the graphene brushes, $I_{chb}$, is defined as the achievable current density, $I_{cd}$, of graphene ($2\times 10^9$ A cm$^{-2}$)[13] times the cross sectional area, $A_b$, of the brushes:

[13] B. Dume, "CVD Graphene Nanoribbons Make Good Interconnects", http://nanotechweb.org/article/tech/50582, Aug. 17, 2012.

$$I_{chb}=I_{cd}\times A_b,\quad (15)$$

where from above:

$$A_b=h_b\times w_b=2.23\times 10^{-4}\ \text{cm}\times 3.8\ \text{cm}=8.47\times 10^{-4}\ \text{cm}^2.\quad (16)$$

Substituting the value for $I_{cd}$ and the result of equation 16 into equation 15 yields:

$$I_{chb}=2\times 10^9\times 8.47\times 10^{-4}=1.69\times 10^6\ \text{A}.\quad (17)$$

From equation 13 above, EcoCharge current for the assumed example is 3,012 ARMS or 4,259 A 0-P providing margin of a factor of 397.

Performance—Current Handling of the Graphene Tabs

Current handling capability of the graphene tabs, $I_{cht}$, is defined as the achievable current density, $I_{cd}$, of graphene ($2\times 10^9$ A cm$^{-2}$)[13] times the cross sectional area, $A_t$, of the tabs:

$$I_{cht}=I_{cd}\times A_t,\quad (18)$$

Where from above:

$$A_t=h_t\times w_t=2.23\times 10^{-4}\ \text{cm}\times 1.91\ \text{cm}=4.26\times 10^{-4}\ \text{cm}^2.\quad (19)$$

Substituting the value for $I_{cd}$ and the result of equation 19 into equation 18 yields:

$$I_{cht}=2\times 10^9\times 4.26\times 10^{-4}=8.52\times 10^5\ \text{A}.\quad (20)$$

From equation 13 above, EcoCharge current for the assumed example is 3,012 ARMS or 4,259 A 0-P providing margin of a factor of 200.

Performance—Current Handling of the Commutator Section

Current handling capability of the commutator section, $I_{chc}$, is defined as the achievable current density, $I_{cd}$, of graphene ($2\times 10^9$ A cm$^{-2}$)[13] times the cross sectional area, $A_c$, of the commutator section:

[13] B. Dume, "CVD Graphene Nanoribbons Make Good Interconnects", http://nanotechweb.org/article/tech/50582, Aug. 17, 2012.

$$I_{chc}=I_{cd}\times A_c,\quad (21)$$

where from above:

$$A_c = h_t \times w_t = 2.23 \times 10^{-4} \text{ cm} \times 3.8 \text{ cm} = 2.5 \times 10^{-3} \text{ cm}^2. \quad (22)$$

Substituting the value for $I_{cd}$ and the result of equation 22 into equation 21 yields:

$$I_{chc} = 2 \times 10^9 \times 2.5 \times 10^{-3} = 5.02 \times 10^6 \text{ A}. \quad (23)$$

From equation 13 above, EcoCharge current for the assumed example is 3,012 ARMS or 4,259 A 0-P providing margin of a factor of 1,179.

Performance—EcoCharge Power Plant Power Versus Driveshaft RPM

The EcoCharge power plant output will be computed for the example shown in FIG. 2 with M=10, N=15 or 150 EcoCharge units, assuming the 15 electric motors are turning their respective driveshafts at the same rpm.

EcoCharge power plant driveshaft generated power is derived beginning with equation 2 above defining emf, V, repeated for convenience:

$$V = \omega BA \sin(\omega t)\cos\theta, \quad (20)$$

and recognizing that each EcoCharge unit is mounted at $\theta=0°$ with respect to the earth's magnetic field and that the conditions of equation 3 apply defining the emf, V, per graphene sheet, repeated with driveshaft frequency as a variable, f, for convenience, $$V = |(2\pi f)(0.5 \times 10^{-4})(4.7)\sin(wt)|V(0-P). \quad (24)$$

The magnitude of V, |V|, for the 6,755 graphene sheet EcoCharge unit in VRMS is:

$$|v| = 6{,}755(2\pi f)(0.5 \times 10^{-4})(4.7)(0.707) = 7.05f \text{ VRMS}. \quad (25)$$

Using the output power analysis associated with FIG. 9 and equations 11-14 above, the output power versus frequency for a single EcoCharge unit is found as:

$$V_o = |V|\frac{R_{tbc}}{R_{tbc} + R_g} = 7.05f(.98) = 6.91f \text{VRMS}; \quad (26)$$

$$I = |V|\frac{1}{R_{tbc} + R_g} = 7.05f(2.13) = 15.02f \text{ARMS}; \quad (27)$$

$$P_o = I \times V_o = 6.91f(15.02f) = 103.79f^2 \text{ WRMS}. \quad (28)$$

Using equation 28 for a single EcoCharge unit, the total EcoCharge power plant output assuming 150 EcoCharge units with 90% inverter and power combiner efficiencies is then:

$$P_{plant} = 103.79f^2(150)(0.9)(0.9) = 12{,}610.49f^2 \text{ WRMS}, \quad (29)$$

where, $$rpm = f \times 60. \quad (30)$$

Equation 29 is plotted in FIG. 9 for rpm=1,000-20,000. As shown in FIG. 9, for a reasonable value of rpm=12,000, the EcoCharge power plant will generate:

$$P_{plant} = 504 \text{ MWRMS}.$$

Performance—Electric Motor Feasibility: Estimated Load Per Motor for Example

The weight budget is an estimate of EcoCharge unit weight from the sum of its components. It is not meant to be the final word on EcoCharge weight, but an estimate, as the weight of the EcoCharge unit will depend on its configuration and desired output power. The EcoCharge unit configuration used for the weight estimate is the configuration used above for performance estimates in this performance section.

The weight of the drive shaft mounted components will be computed in order to determine the size of electric motor required to drive 15 EcoCharge units comprising the assumed example (M=10, N=15) EcoCharge power plant configuration where 10 electric motors are assumed to drive 15 EcoCharge units each. Components contributing to the load of the motor include the mounting drum and the graphene sheets for both the emf generator and commutator. Note that the mounting drum is assumed to be fabricated from ABS wrapped with carbon fiber on the exterior for reduced weight and sturdiness.

The weight of graphene for the emf generator in the assumed example, $Wt_{gt}$, is computed as follows.

The total area, $A_{gt}$, of 6,755 sheets of graphene is:

$$A_{gt} = (3.14 \text{ m})(1.5 \text{ m})(6{,}755) = 31{,}816 \text{ m}^2. \quad (31)$$

The density of graphene[2] is:

$$\rho = 0.77 \text{ mg/m}^2. \quad (32)$$

Combining equations 31 and 32 and solving yields:

$$Wt_{gt} = 0.77(31{,}816) = 24{,}498 \text{ mg}(\rightarrow \div 28.35 \text{ gm/oz})$$

$$Wt_{gt} = 0.86 \text{ oz}(\rightarrow 0.05 \text{ lbs}). \quad (33)$$

The weight of graphene for the commutator in the assumed example, $Wt_{ct}$, is computed as follows.

The total area, $A_{ct}$, of 6,755 sheets of graphene for the commutator is:

$$A_{ct} = (3.14 \text{ m})(0.038 \text{ m})(6{,}755) = 403 \text{ m}^2. \quad (34)$$

Combining equations 34 and 32 and solving yields:

$$Wt_{ct} = 0.77(403) = 310.3 \text{ mg}(\rightarrow \div 28.35 \text{ gm/oz})$$

$$Wt_{ct} = 0.01 \text{ oz}(\rightarrow 0.0007 \text{ lbs}). \quad (35)$$

The weight of the graphene sheets, equations 33 and 35, are added to the weight of the EcoCharge unit mounting drum in table 1 below.

TABLE 1

Weight Estimate per EcoCharge Driveshaft for Example

| ECOCHARGE COMPONENT | WEIGHT ESTIMATE (LBS) |
|---|---|
| Graphene sheets Commutator | 0.05 |
| Graphene sheets | 0.0007 |
| ABS tube (1" D × 39.6" OD × 6" L) Mounting Drum | 14.25 |
| End wheels (2 ABS tubes 1" D × 39.6" OD × 1" L) | 7.12 |
| Spokes (8 ABS rectangles .5" D × 1" W × 35.1" L) | 5.44 |
| Slabs (4 ABS rectangles .5" D × 2" W × 5' L) | 9.28 |
| Slabs (4 ABS rectangles .25" D × 2" W × 5' L) | 4.64 |
| End wheel hubs (2 ABS tubes 1" D × 3.5" OD × 1" L) | 0.36 |
| Insulator ridge (ABS rectangle .125" D × .125" W × 5' L) | 0.04 |
| Carbon fiber (5' W × 10.362' L) | 1.26 |
| TOTAL WEIGHT PER ECOCHARGE UNIT | 42.4407 |
| TOTAL WEIGHT FOR 15 ECOCHARGE UNITS | 636.6105 |

Performance—Electric Motor Feasibility: Size, Input Power, and EcoCharge Power Gain for Example The size of the electric motor, in horsepower (HP), required to drive 15 EcoCharge units for the feasibility example is found by using the radial load equation[14] for an electric motor.

[14]http://www.diequa.com/service/radial_loads.html $$\text{Radial load (lbs)} = \text{overhung load (OHL)} = (63{,}000 \times HP \times F)/(N \times R) \quad (36)$$

where:
HP=transmitted horsepower
F=load connection factor=1.25 (assumed spur, helical gear)
N=RPM of shaft=12,000 (assumed)
R=driveshaft radius in inches=1.25 (assumed)
Radial load=636.6 lbs (from Table 1).

$$\text{Radial load}=636.6=(63{,}000 \times HP \times 1.25)/(12{,}000 \times 1.25).$$

Solving for HP:

$$HP=636.6(12{,}000 \times 1.25)/(63{,}000 \times 1.25)=121.26. \quad (37)$$

A standard 125 HP electric motor can be used to drive the 15 EcoCharge units for the example being considered. The input electric power to the motor is found as:

$$P_{kW}=HP \times 0.746=121.26 \times 0.746=90.46 \text{ kW}. \quad (38)$$

From above, a single EcoCharge unit provides 4.15 MW of power, therefore 15 EcoCharge units driven by a single electric motor and using 90% efficient frequency inverters and power combiners provide:

$$P_{15\,EC}=4.15 \text{ MW} \times 15 \times 0.9 \times 0.9=50.4 \text{ MW}. \quad (39)$$

Taking the ratio of the results of equations 39 and 38 yields the EcoCharge power gain, $P_{G\,EC}$, for one electric motor driving 15 EcoCharge units:

$$P_{G\,EC}=(50.4 \text{ MW})/(90.46 \text{ kW})=557.15. \quad (40)$$

What is claimed is:

1. A 504 MW electric power plant based on electromotive force from the earth's magnetic field provided by 150 EcoCharge units, comprising:
   a. A mounting drum, commutator and bearing coupled to a 2.5 inch diameter drive shaft driven by an electric motor within an environmentally sealed cover with two environmentally sealed electrical vias for power output;
   b. Said mounting drum 1 m in diameter by 1.5 m wide constructed with ABS parts including an ABS insulator ridge, 0.125 inch wide by 5 feet long by 0.125 inch in depth, and a carbon fiber insulator secured to the circumference of said mounting drum;
   c. 6,755 layered, graphene sheets, 1.5 m wide, mounted around said mounting drum on said insulator with a designated plus (+) side abutting one side of said insulator ridge and a designated minus (−) side abutting the other side of said insulator ridge wherein said plus (+) and minus (−) sides of the layered graphene sheets do not make contact;
   d. Plus (+) interface tabs, 0.75 inch wide, protruding 4.5 inches from said plus (+) side of said layered graphene sheets;
   e. Minus (−) interface tabs, 0.75 inch wide, protruding 4.5 inch from said minus (−) side of said layered graphene sheets;
   f. Said commutator containing two semicircular sections with said semicircular sections 1.57 m in semicircular circumference (that is, each said section is half the full circumference) by 0.038 m wide and constructed of 6,755 sheets of graphene with said graphene sheets attached to a commutator mount, 6 inches wide by 3.14 m in circumference constructed from ABS, which is attached to said mounting drum and containing:
      i. tab connectors for mating with said plus (+) and minus (−) interface tabs,
      ii. two brushes 1.5 inches wide made from 6,755 layered sheets of graphene, and
      iii. two brush arms attached to said environmentally sealed cover on one end using two commutator brush arm mounts and said brushes on the other end, applying tension to said brushes on said commutator sections;
   g. Two AWG 0000 copper wires, one from each said commutator brush arm mount through said vias providing EcoCharge generated power to a frequency inverter;
   h. Said frequency inverter for each of the 150 EcoCharge units to convert the frequency of the electrical power to 60 Hz to match the grid;
   i. A power combiner to combine the power from said inverters yielding the total power plant output of 504 MW.

2. An EcoCharge unit used alone or in multiples for generating electromotive force from the earth's magnetic field for electric power, comprising:
   a. A mounting drum, commutator, and bearing coupled to a drive shaft and driven by an electric motor within an environmentally sealed cover with two environmentally sealed electrical vias for power output;
   b. Said mounting drum constructed with an insulator including an insulator ridge and an insulator secured to the circumference of said mounting drum with the mounting drum secured to said drive shaft within said environmentally sealed cover;
   c. Layered, graphene sheets mounted around said mounting drum on said insulator with a designated plus (+) side abutting one side of said insulator ridge and a designated minus (−) side abutting the other side of said insulator ridge wherein said plus (+) and minus (−) sides of the layered graphene sheets do not make contact;
   d. Plus (+) interface tabs protruding from said plus (+) side of said layered graphene sheets;
   e. Minus (−) interface tabs protruding from said minus (−) side of said layered graphene sheets;
   f. Said commutator constructed of layered sheets of graphene and said graphene sheets attached to a commutator mount which is attached to said mounting drum and containing:
      i. tab connectors for mating with said plus (+) and minus (−) interface tabs,
      ii. two brushes made from layered sheets of graphene, and
      iii. two brush arms attached to said environmentally sealed cover on one end using two commutator brush arm mounts and said brushes on the other end, applying tension to said brushes on said commutator sections;
   g. Two wires, one from each said commutator brush arm mount through said vias providing EcoCharge generated power to a frequency inverter;
   h. Said frequency inverters to convert frequency to 60 Hz to match the grid;
   i. A power combiner to combine the power from said inverters yielding the total power plant output.

* * * * *